Dec. 13, 1966           G. MEINAS           3,291,278

ELEVATORS

Filed June 22, 1965           6 Sheets-Sheet 1

3,291,278
ELEVATORS
Georg Meinas, Munich, Germany, assignor to Ossakki
A.G., Zug, Switzerland, a Swiss body corporate
Filed June 22, 1965, Ser. No. 465,952
8 Claims. (Cl. 198—20)

This is a continuation-in-part of Serial No. 352,252, filed March 16, 1964, now abandoned.

The present invention relates to an elevator and more particularly to a part of a conveyor installation incorporating an elevator.

The present invention has been more particularly devised for making possible the convenient vertical transport of objects in conveying installations of the type having horizontal conveyors arranged in pairs, one conveyor in each pair being above the other. In such an installation objects to have work performed upon them by sitting or standing workers pass along the top conveyor of the pair of conveyors and are then moved sideways off the top conveyor so that a worker can perform the necessary operation while sitting or standing in the immediate vicinity of the pair of conveyors. When the operation has been performed on any object the object is transferred onto the lower conveyor which generally runs in the opposite direction to the top conveyor.

One particular object of the invention is to make an elevator which can receive objects from any one of the two or more conveyors at a lower level and transfer them to any one, at will, of any two or more conveyors at a higher level.

A further object of the invention is to make such an elevator which is relatively cheap and simple in construction.

While the ambit of the invention is defined in the Patent claims coming at the end of my specification, the following particular description will enable those skilled in the art to put the invention into practice. This description refers to the accompanying drawings in which:

It should be mentioned by way of introduction that my elevator or lifting device for use with conveyor systems comprises a support which can be tilted towards one of a number of conveyors converging towards a common vertical axis so as to facilitate the transfer of an object from one of the conveyors onto the support, means for moving the object vertically along the axis, and means for tilting the object towards another of the conveyors to which the object is to be delivered.

Figure 1:
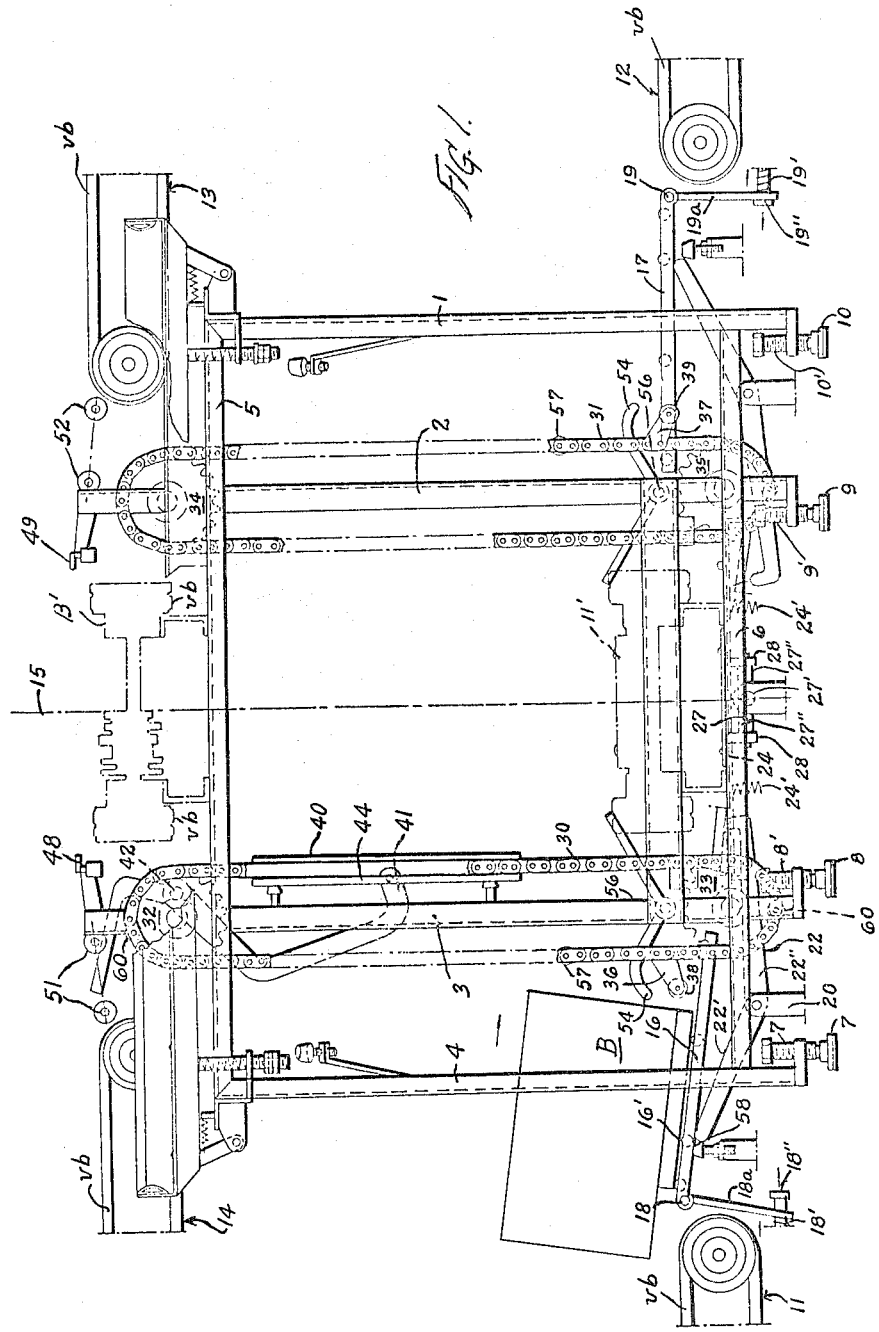
FIGURE 1 is a general view of the elevator at the beginning of a working operation.
Figure 2:
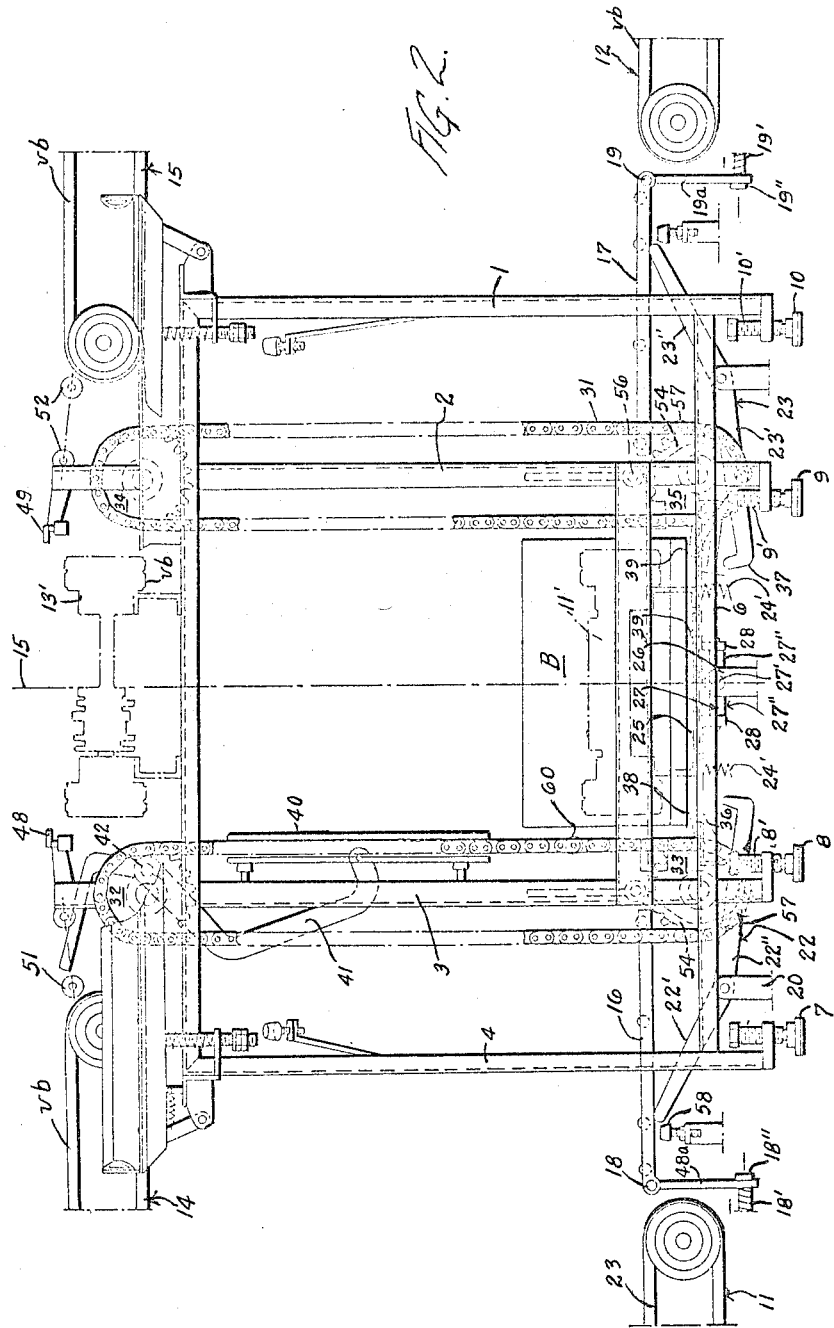
FIGURES 2, 3 and 4 are successive views of the elevator during a working operation.
Figure 3:
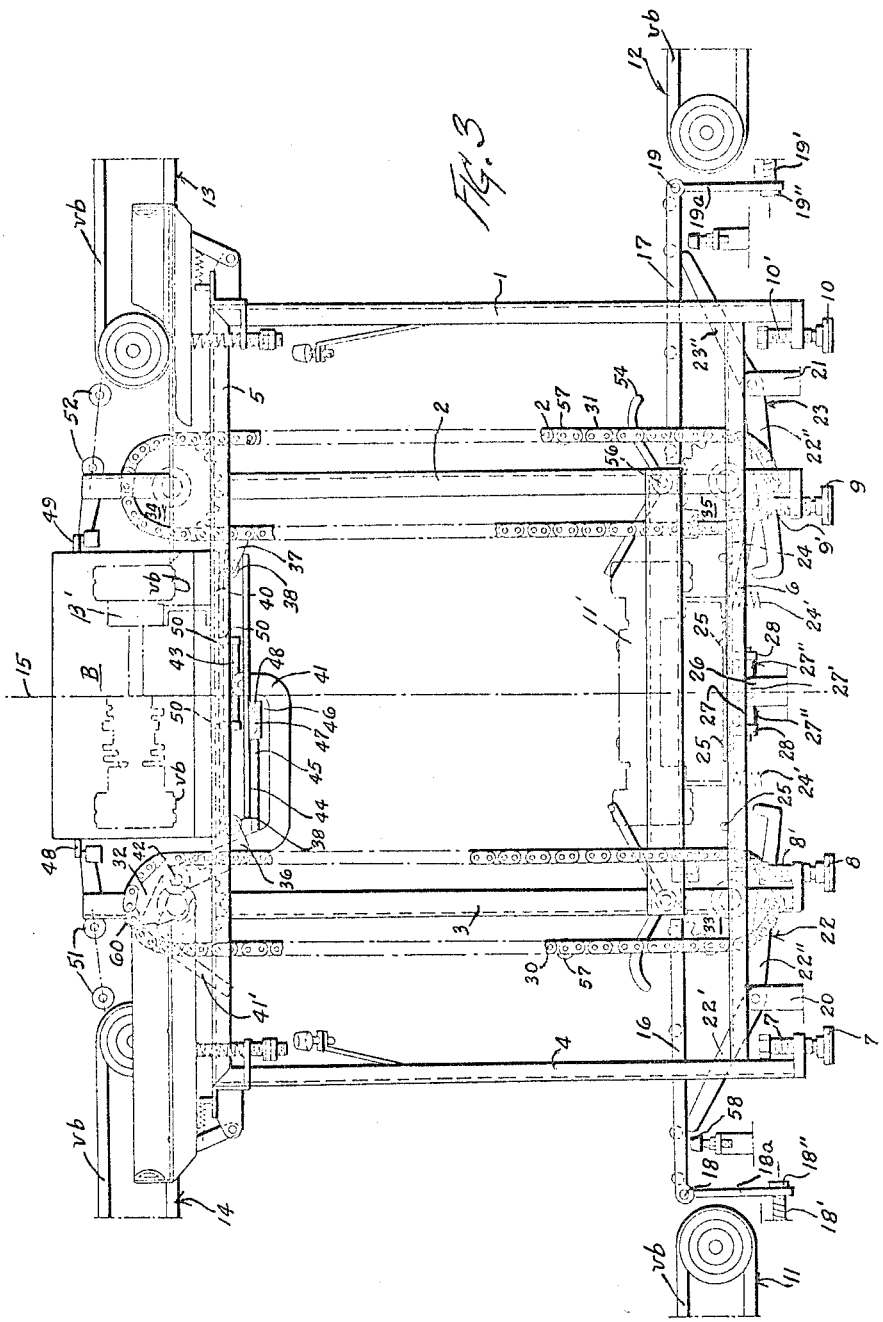

Referring now to the figures and more particularly to FIGURES 1, 2 and 3, it will be seen that my improved elevator comprises a frame made up, for instance, of angle iron. The frame includes four vertical members 1, 2, 3 and 4 connected at their bottom and top ends, by two horizontal members 5 and 6. The lower ends of the frame members 1, 2, 3 and 4 carry feet 7, 8, 9 and 10 whose vertical positions can be adjusted by means of bolts 7', 8', 9' and 10' provided with hexagon heads for turning them. In this manner the frame may be supported on an uneven surface without throwing unequal stresses upon it.

My elevator is arranged to connect three generally horizontal belt conveyors denoted by the general reference numerals 11, 11' and 12, at a lower level with three upper conveyors 13, 13', 14. The elevator also connects two further conveyors running at the same level as the conveyors 11 and 14, at right angles to the plane of FIGURE 1 and running towards conveyors 11' and 13' and towards the plane of the figure and are therefore not shown.

(It will be noted that each of the eight conveyors, comprises two V-belts denoted by $bb$ in relation to conveyors 13 and 13'.) However in most of the ensuing description reference is only made to the four conveyors 11, 12, 13 and 14 since these conveyors are shown in much more detail than the other four conveyors. In the particular concrete embodiment of my elevator as shown, the lower conveyors 11 and 12 are arranged to bring boxes such as B towards the elevator while the top conveyors 13 and 14 are arranged to function in the opposite direction, i.e. they remove boxes, when lifted by the elevator, away from the elevator.

Generally for purposes of description it is convenient to talk of all the conveyors converging towards a common vertical axis shown in chain line and indicated by reference numeral 15.

Between their ends adjacent the vertical axis 15 and the vertical axis itself the conveyors 11, 11' and 12 are provided with tilting ramps such 16 and 17. The ramps hinge downwards about fixed pivot axis 18 and 19 and are normally held in their horizontal positions by means of springs 18' and 19' (guided by horizontal pins 18'' and 19'') acting on limbs 18a and 19a attached to the ramps 16 and 17 respectively. The means on which the pins 18'' and 19'' are mounted are not shown in order to simplify the drawing but it may be assumed for the present purpose that they are attached to a lateral extension of the frame.

Also on the frame, I provide pivot mountings 20 and 21 carrying levers denoted by general reference numerals 22 and 23, each of which has two limbs denoted by 22' and 22'' and by 23' and 23'' respectively, the limbs in each lever making an angle slightly under 180° with each other. Each lever is arranged under the respective tilting ramp and under a generally horizontal support 24 which carries four rollers 25 of the freely turning type generally used in the conveyor art. This generally horizontal support 24 is carried by a pair of pillar like parts 26. These two parts 26 carry a cross 27 of which two oppositely placed rod-like limbs 27' are journalled in the parts 26 while the ends of the other two rod-like limbs 27'' are journalled in lugs 28 fixed to the bottom face of the support 24. As a result of this form of mounting for the support 24, the latter can tilt about two discrete horizontal axes, that is to say the axes formed by the axes of the limbs 27' and 27'' of the cross 27.

When no weight is placed on the ramps 16 and 17, the ramps are held in their horizontal positions by the springs 18' and 19' and consequently, the plate like support 24 is held in a horizontal position. The support is also urged into a horizontal position by springs 24'.

In order to raise a wooden box such as B, that is to say to move it along the vertical axes 15, I provide two chains 30 and 31 guided at their top and bottom ends by four sprockets 32, 33, 34 and 35. One sprocket of each chain is journalled on a shaft but the other one is driven by its shaft through reduction gearing by an electric motor or other conventional drive which is not shown in order to simplify the drawings.

In order to lift an article or object such as the wooden box B, the chains 30 and 31 are provided with brackets 36 and 37 which carry rollers 38 and 39. When the chains are turned, the left hand one in a counterclockwise direction and the right hand one in a clockwise direction, the rollers 38 and 39 first pass downwards around the bottoms of the sprockets 33 and 35 and then pass upwards through openings (not shown) in the opposite sides of the support 24 engaging the bottom of the box B. Consequently the box is lifted upwards.

For removing the object which has been lifted by the elevator, I provide a support plate 40 which in its inactive position is vertical and lies to one side of the vertical axis 15 as shown in FIGURE 1. The plate 40 is carried on a pair of arms 41 swinging about a horizontal pin 42. It is connected with these arms by a cross-like member 43 (see FIGURE 3) which is similar in form and function to the part 27 carrying the support 24 and therefore will not be described in more detail, it being sufficient to say that it allows the plate 40 to tilt about two mutually perpendicular axes. In order to steady the plate 40 when it is swung on the arms 41 and the latter are moved around their pivot 42, I provide a plate 44 guided by a rod 45 (see FIGURE 3) which is connected with the part 44 by means of a pin 46 sliding in slots 47 in two lugs fixed to the part 44 so that, as plate 40 is raised to its highest level plate 44 becomes horizontal under the influence of rod 45.

In order to cause tilting of the plate 40 in its uppermost position I provide four latches two of which (48 and 49) are shown in FIGURE 1. The latches are operated in pairs so as to overhang any two adjacent corners of the plate 40. It will be noted that the plate 40 is provided with several freely running conveyor rollers 50 to enable objects to move over its surface freely.

In order to receive an object or article such as a wooden box from the support plate 40, I provide a pair of inclined ramps in the form of sets of freely rotating rollers 51 and 52 leading onto the horizontal conveyors 13 and 14.

Figure 4:
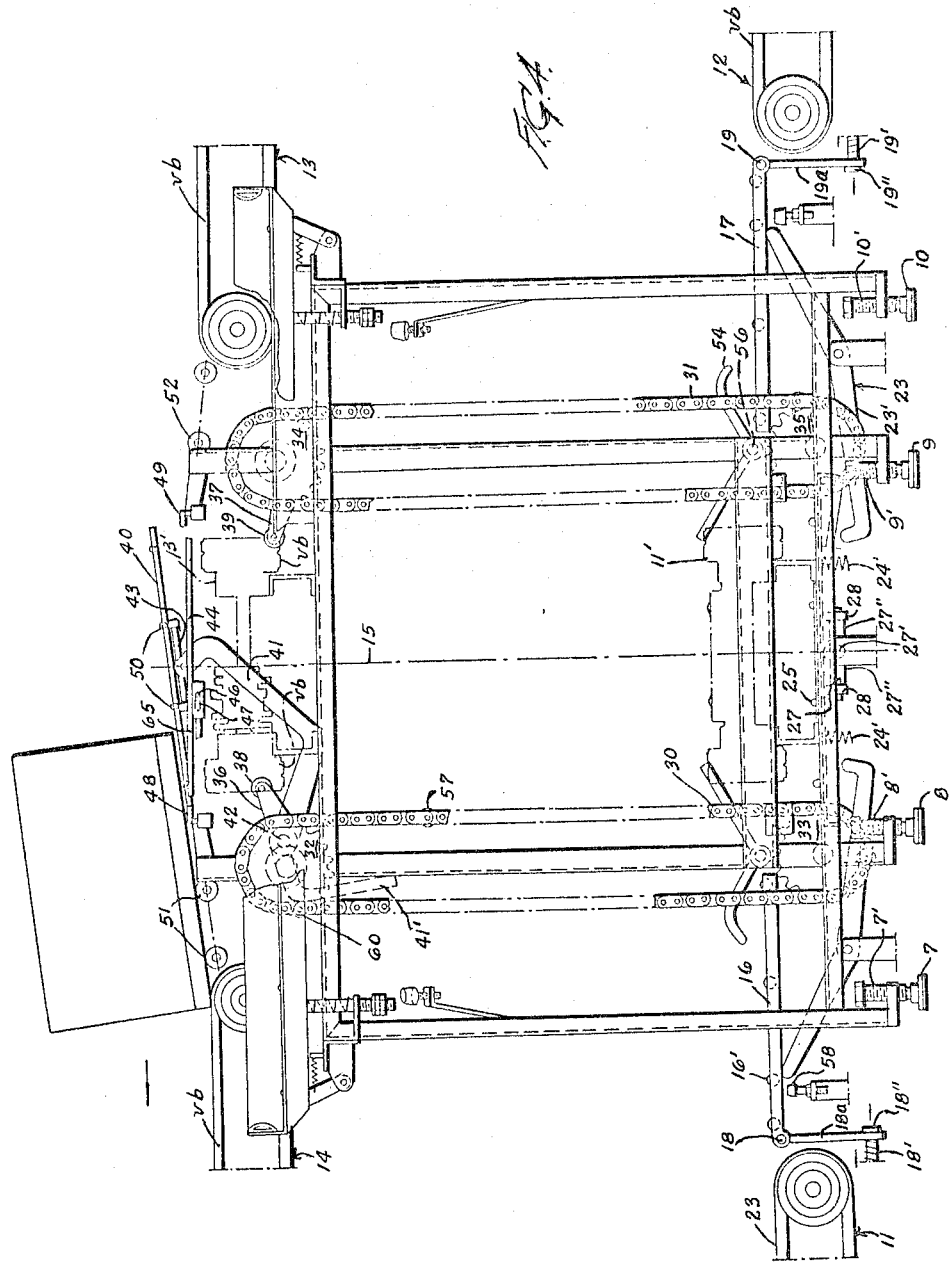

The box will have no tendency to tilt so long as it is supported by rollers 38 and 39, but these rollers cease to support the box when the chains 30 and 31 curve around sprockets 32 and 34. At this time the box B is supported by plate 40 which lifts the box beyond the uppermost position possible when supported by rollers 38 and 39. There are rollers 51 and 52 closely adjacent the box B as it is lifted to the position shown in FIG. 3 over which the box B will pass on its way to conveyor 14 or 13. It will be noted in FIGURE 4 that the plate 40 is tilted to be coplaner with rollers 51 to discharge box B to the left and in this position plate 40 also is against plate 44 which is horizontal. In the FIGURE 4 showing, latch 48 has engaged the edged plate 40 and so has assured that plate 40 is coplaner with rollers 51 to the left. If, however, box B is unevenly loaded so that, at the moment the support of roller 38 and 39 is withdrawn, the box B tilts to the left, it cannot tilt beyond the angle seen in FIGURE 4. If the latch 49 is extended, under these circumstances, the plate 40 will be tilted to the right to assume its proper position so that the box B will roll over rollers 52 to conveyor 13.

Since a box or other articles to be lifted from one of the lower conveyors 11 and 12 to one of the other upper conveyors 13 and 14 might be pushed onto one of the ramps 16 and 17 before it was desired to receive it on the plate 24, barriers 54 are provided. Each barrier swivels about a horizontal axis 56 and is moved by rollers 57 on the chains 30 and 31.

The ends of barriers 54 extend laterally to engage the corners of box B when in the position seen in FIGURE 1. Rollers 57 press the barriers down past the bottom of the box and past ramps 16 and 17. As the box is lifted by the rollers 38 and 39, the roller 57 passes beyond the barriers 54 which are then returned to their original position by their counterweight arms.

The mode of operation of the elevator is as follows:

When a box or other article B is delivered onto one of the tilting ramps 16 and 17, the ramp, say ramp 16, is tilted downwards as shown in FIGURE 1 until it is stopped by an abutment 58. Owing to the lever 22 forming a linkage between the tilting ramp 16 and the support 24, as the ramp 16 tilts downwards about its horizontal pin 18, the adjacent edge of the support 24 is pushed upwards until, owing to the accurate preadjustment of abutment 58, both the ramp and the support 24 stop in a coplanar position so that the box can roll down along rollers 16' on ramp 16 onto the rollers 25 of the support 24. When the box B has left the ramp 16 the ramp is returned to its horizontal position by the spring 18' and the support 24 is moved into a horizontal position by springs 24'. The drive for the chains 30 and 31 is now switched on and in consequence the brackets 36 and 37 carrying the rollers 38 and 39 are moved downwards from the position shown in FIGURE 1 into the position shown in FIGURE 2 engaging, through openings in support 24, the bottom of box B. As the chains continue to move the brackets 36 and 37 move the box upwards until when the box is in the position shown in FIGURE 3 a roller 60 on the left hand chain engages a tail or cam portion of the levers 41 causing them to move in a counter-clockwise direction about the horizontal pivot axis 42. As a result the support plate 40 and the part 44 are swung upwards out of the position shown in FIGURE 3 into that shown in FIGURE 4. The tail portion of the arms 41 is specially designed so as to give a convenient motion for the rest of the arms 41. The part 44 guided by the rod 45 maintains the support plate so that it is approximately parallel to the straight part 41' of the arms 41 during the swinging of the plate 40 from the position shown in FIGURE 1 to that shown in FIGURE 4.

On continued rotation of the chains 30 and 31 about sprockets 32' to 35, the roller 60 moves along the straight part 41' of tail of the arms 41 and consequently swings the arms further in a counter-clockwise direction about the horizontal pivot axis 42 thus lifting the support plate 40 at a speed greater than that of the rollers 38 and 39 so that the box is lifted clear from them along the vertical axis 15. The box is prevented from sliding off the support plate 40 by the adjacent end rollers 51, 52 of the inclined ramps.

In order to select the upper conveyor onto which the box B is to be delivered, two of the four latches represented by latches 48 and 49 in FIGURE 1 are turned so as to overhang an edge of the support plate 40. Manual, or conventional control means is provided to select the appropriate two latches to tilt the plate 40 in the direction to discharge box B onto the desired conveyor 13, 13' or 14. Thus if the box is to be discharged to the left along conveyor 14, the latch 48 and the further latch behind it (not visible in the drawings) are swung over the corners of the plate 40, so that as the plate rises with its left hand side held down and when the side of the box B is clear of the uppermost roller 51, the box moves down the rollers 51 of the inclined ramp onto the conveyor 14.

In order to discharge the box onto the conveyor 13' visible in FIGURE 1 the two latches not shown in the drawing, i.e. those latches behind latches 48 and 49 would be operated so that the edge of the plate 40 nearest to the conveyor 13' would be held down.

Figure 5:
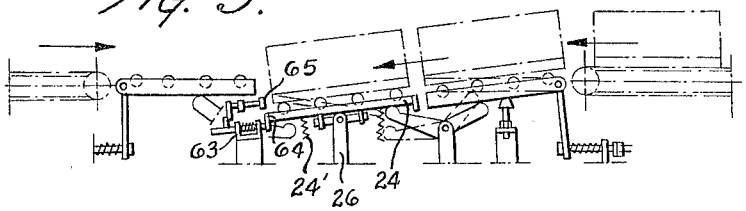
FIGURE 5 is a further view of the apparatus.

Various modifications may be made in the elevator just described. Thus, in order to prevent springs 24' from returning the support 24 prematurely into its horizontal position, that is to say before a box B has been completely rolled onto it, I provide four spring actuated bolts 63 of which one is shown in FIGURE 5. This bolt is arranged to engage a striking plate 64, similar to the striking plate use in conjunction with a door lock, fixed to the adjacent edge of the support 24. Thus when the support 24 is tilted into position shown in FIGURE 5, the bolt is first driven back and then springs forward into a hole provided in striking plate 64. In consequence the support 24 is held positively in the angular position shown in FIGURE 5. When the box, however, has rolled fully onto the support 24, it strikes a bolt released mechanism including a buffer 65 actuating a lug on the bolt 63 and consequently the bolt is released and the support 24 with the box B on it is moved into a horizontal position by means of the springs 24′.

The buffer 65 is provided with switch means for starting the drive means for the chains 30 and 31. In order to stop the drive means a switch is provided to be actuated by the plate 40 when it is raised.

Figure 6:
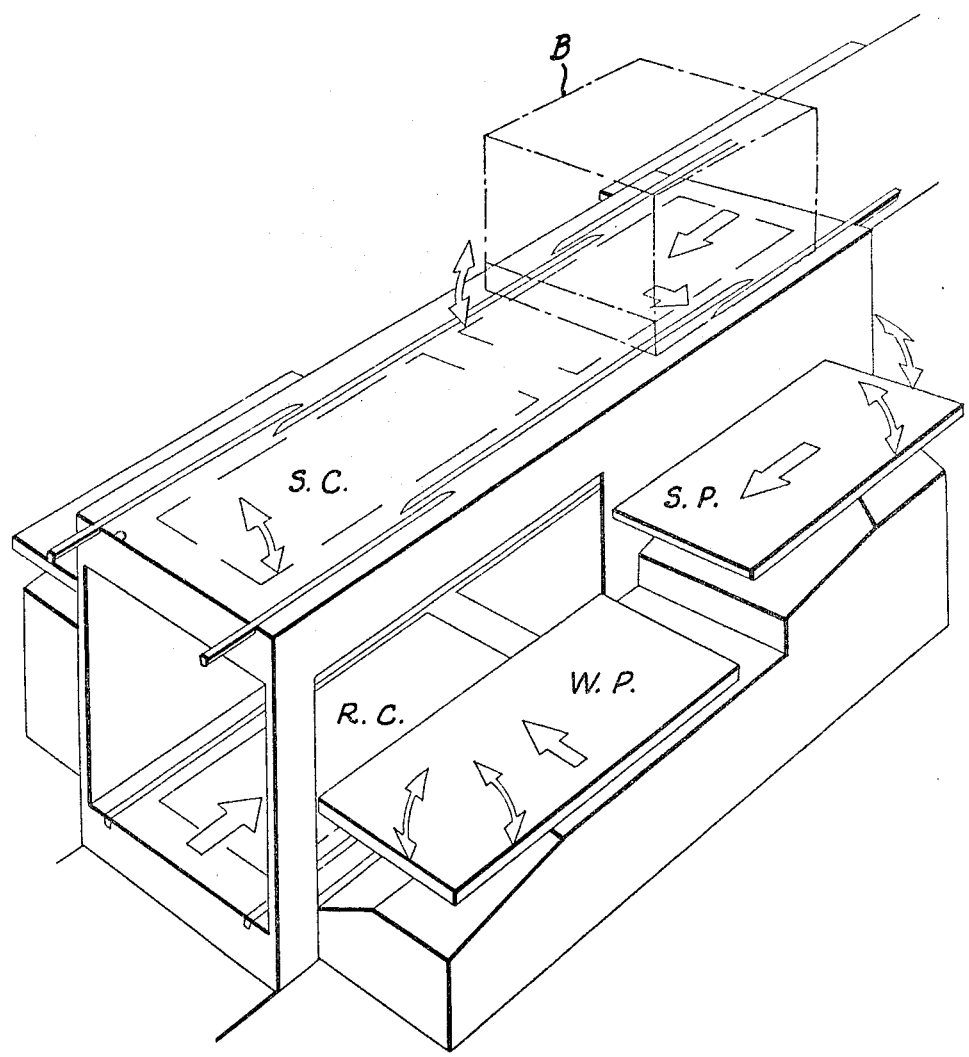
FIGURE 6 is a diagrammatic view of an operative position.

An elevator such as just described with reference to the drawings, that is to say one which may receive an object from any one of a number of directions at one level, transfer it to a different level and discharged in any one of a number of different directions has many applications but perhaps the most important application is to conveyor systems using horizontal supply and return conveyors arranged in pairs, each pair comprising one supply conveyor vertically above a return conveyor. A row of working positions, for instance for performing operations on materials conveyed in boxes on the conveyors it may be arranged along such a pair of conveyors. The equipment for a single working position can be as shown in FIGURE 6. Here, as shown diagrammatically coming along the top supply conveyor, box B containing textile material on which various manual operations are to be performed, is tipped sideways off the supply conveyor SC on to a storage plate SP which is tipped upwards towards the conveyor so that the box can more easily slide onto it. The box B is then tipped downwards onto a working plate WP, this being facilitated or caused by tilting the plates SP and WP so that they form one plane. When the operator has finished the manual task to be performed upon the contents of the box, the plate WP is tilted towards the return conveyor RC and the box slides off onto the latter. Normally the operator will have two boxes, one on the storage plate SP in reserve and a further box on the plate WP.

Further details of such a mechanism are described in the British patent specification 939,746.

Figure 7:
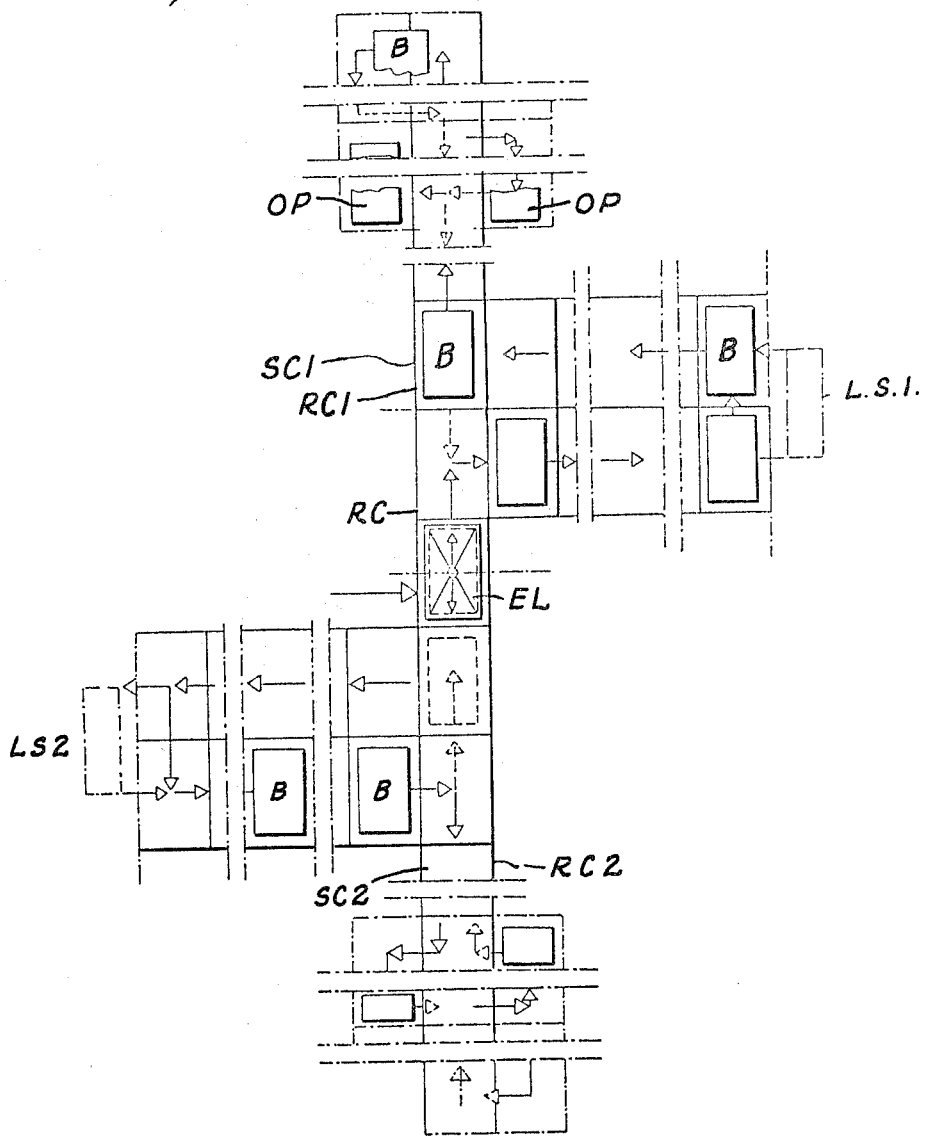
FIGURE 7 is a plan view of a conveyor system incorporating my improved elevator.

A complete conveyor system constituting a production line can be as shown in plan in FIGURE 7. Here the boxes B are charged with the articles to be fabricated in them at loading stations LS1 and LS2. After returning from one of the loading stations, for instance loading station LS1, they are placed by suitable conveyor mechanism on a top supply conveyor which leads them to various operator positions OP each equipped with the mechanism such as shown in FIGURE 6. The movement of the boxes along the top supply conveyors SC1 and SC2 and to and from the loading stations LS1 and LS2 are indicated by arrows drawn in full lines. The return conveyors RC1, RC2 are of course not visible in FIGURE 7 as they are placed directly underneath the supply conveyors SC1 and SC2. The movement of the boxes along these return conveyors is indicated by arrows shown in broken lines. Both the return conveyors RC1 and RC2 lead to the elevator EL which is as described in FIGURES 1 to 6 the elevator allows a box coming in from either of the return conveyors RC1 or RC2 to be lifted to the level of the supply conveyors SC1 and SC2, or strictly speaking to a level slightly above these conveyors and then the box runs down onto one or other of them for further elaboration of its contents. Thus a box loaded in the loading station LS1 is first passed to an operator at an operating station along the supply conveyor SC1 and then may be passed via the elevator EL to a further operator along the supply conveyor SC2 and then finally via the elevator may be lifted back onto the conveyor SC2 and passed to the loading station S2 where its contents are removed until it is charged again with further material to be elaborated.

While I have described one particular from of my invention so that those skilled in the art may take full advantage of it, it is to be understood that the monopoly which I seek in the United States is not to be limited to this particular form of construction but is to be defined by the gist and spirit of the following patent claims.

I claim:

1. In a system of generally horizontal conveyors comprising a plurality of such conveyors converging at each of two levels towards a common vertical axis, the invention which consists in the provision of an elevator for vertical transport of objects from one conveyor level to another, comprising; a generally horizontal support for receiving at the bottom of said elevator an object to be elevated; a tilting ramp placed between an end of one of the horizontal conveyors and the support; linkage means between this tilting ramp and the support for causing the support to tilt upward as the ramp is tilted downwards to bring the top of said support into alignment with the top of said ramp; abutment means for arresting the tilting when the ramp and the support are coplanar; means for moving an object from the support along the vertical axis; means for holding the object at a level above the level of one of the horizontal conveyors by a predetermined amount; and means for tilting the holding means towards this last-named conveyor.

2. In a conveyor system comprising at least two generally horizontal conveyors converging towards a common vertical axis at different levels, the conveyors when seen in plan making an angle with each other, the invention which consists in the provision of an elevator for transferring objects from one conveyor to the other, comprising; a frame, a generally horizontal support, the support being capable for arresting vertical movement of the object at a position lower by a relatively small amount than the level of one of the conveyors; tilting ramp means between the last named conveyor and the support; a lever lying underneath the ramp and underneath the support; pivot means for the lever, the lever being so arranged that lowering of the ramp causes that edge of the support which is nearest to the ramp to be tilted upwards; means for arresting such tilting movement when the ramp and the support lie substantially in the same plane; means for returning the support after such tilting to a generally horizontal position; a support plate for moving the object vertically until it is at a position slightly above, by relatively small amount, another of the conveyors; the last named conveyor having a sloping ramp towards the conveyor; and means for tilting the support plate towards the last-named ramp so as to be generally coplanar with it.

3. In a conveyor system comprising at least two pairs of generally horizontal conveyors adapted for engaging the bottoms of objects placed on them, one member of each pair of conveyors lying above the other member and the two lowermost conveyors lying at the same level while the two uppermost conveyors also lie at the same level, the four conveyors extending radially from a common vertical axis, the invention which consists in the provision of tilting ramps at the end of each of said lowermost conveyors pivoted near the ramp and adjacent the lowermost conveyor with which it is associated, so that an object on said ramp will tilt it downwardly, an elevator structure at said common vertical axis connecting the two upper with the two lower conveyors and comprising a frame, a tiltable support mounted in said frame at said common vertical axis and located adjacent said tilting ramps at the ends of said lowermost conveyors, pivot means supporting said tiltable support a relatively small distance below the level of said tilting ramps allowing said support to tilt away from one or the other of the tilting ramps, a pivoted lever under each of the tilting ramps, said lever being arranged to cause tilting of the support so that its edge nearest to the ramp tilted by presence of an object thereon moves upwards, abutment means for arresting such tilting movement when the tilting ramp and the support are generally coplanar so that the object is transferred by gravity from said ramp to said support, means for moving an object vertically from the support to a level above the said uppermost conveyors by relatively small amount, inclined ramps positioned between the ends of the two uppermost conveyors adjacent the elevator structure and the said conveyors and means for selectively causing tilting of the object towards one or the other of the inclined ramps.

4. In a conveyor system comprising at least two pairs of generally horizontal conveyors adapted for engaging the bottoms of objects placed on them, one member of each pair of conveyors lying in a plane above the other member and the lowermost conveyors lying at the same level while the uppermost conveyors also lie at the same level, the said conveyors converging towards a common vertical axis, the invention which consists in the provision of a frame, a tiltable support mounted in said frame at said common vertical connecting the upper conveyor to the lower conveyors and comprising a frame, a support supported between the said ramps at the lowermost conveyors level between the ends of the respective conveyors and the vertical axis, pivot means for holding the support at a relatively small distance below the tilting ramps allowing said support to tilt away from one or the other of the tilting ramps, a pivoted lever under each of the ramps, each such lever being arranged to cause tilting of the support so that its edge nearest to the ramp that is tilted by presence of an object thereon moves upwards, abutment means for arresting such tilting movement when the tilting ramp and the support are generally coplanar so that the object causing tilting of said ramp is transferred by gravity and said support, two endless chains rotating about vertically spaced axes, means mounted on the chains arranged to pass upwards on the chains through openings in the support to contact the lower face of an object on the support to lift an object from said support at said lowermost conveyors to a level adjacent said uppermost conveyors, a support plate, means for moving the support plate up underneath the object so as to raise an object thereon to a position higher than said uppermost conveyors, inclined ramps between the ends of the uppermost conveyors and the elevator structure, and means for selectively causing tilting of the support plate towards one or the other of the inclined ramps.

5. The structure as set forth in claim 4 comprising barrier means for preventing objects passing onto the support; and means on the chains for actuating the barrier means whereby the barrier is removed in timed relation to the operation of said elevator.

6. The structure as set forth in claim 4 wherein at least one pivoting arm is provided for lifting said support plate to contact the object after the object has been lifted by said chains, one of said chains being provided with a part on it for contacting a tail portion of the arm to move it.

7. The structure as set forth in claim 6 provided with movable abutments carried by said arm for controlling the tilt of the support plate.

8. The structure as set forth in claim 7 further comprising buffer means, drive means for said chains, switch means actuated by the buffer means for switching on said drive means connected with the chains, and further switch means arranged to be operated by raising of the support plate for switching off the drive means connected with the chains.

References Cited by the Examiner

UNITED STATES PATENTS

| | | | |
|---|---|---|---|
| 1,021,876 | 4/1912 | Lister | 198—156 X |
| 1,794,331 | 2/1931 | Klyver et al. | 198—156 X |
| 1,949,964 | 3/1934 | Keller et al. | 198—155 X |
| 2,663,446 | 12/1953 | Romain | 198—155 X |
| 3,000,518 | 9/1961 | Baumann | 214—11 |
| 3,037,608 | 6/1962 | Rothschild | 198—163 X |
| 3,184,032 | 5/1965 | Jonsson | 198—156 X |

EVON C. BLUNK, *Primary Examiner.*

SAMUEL F. COLEMAN, *Examiner.*

R. M. WALKER, E. A. SROKA, *Assistant Examiners.*